Patented Feb. 21, 1933

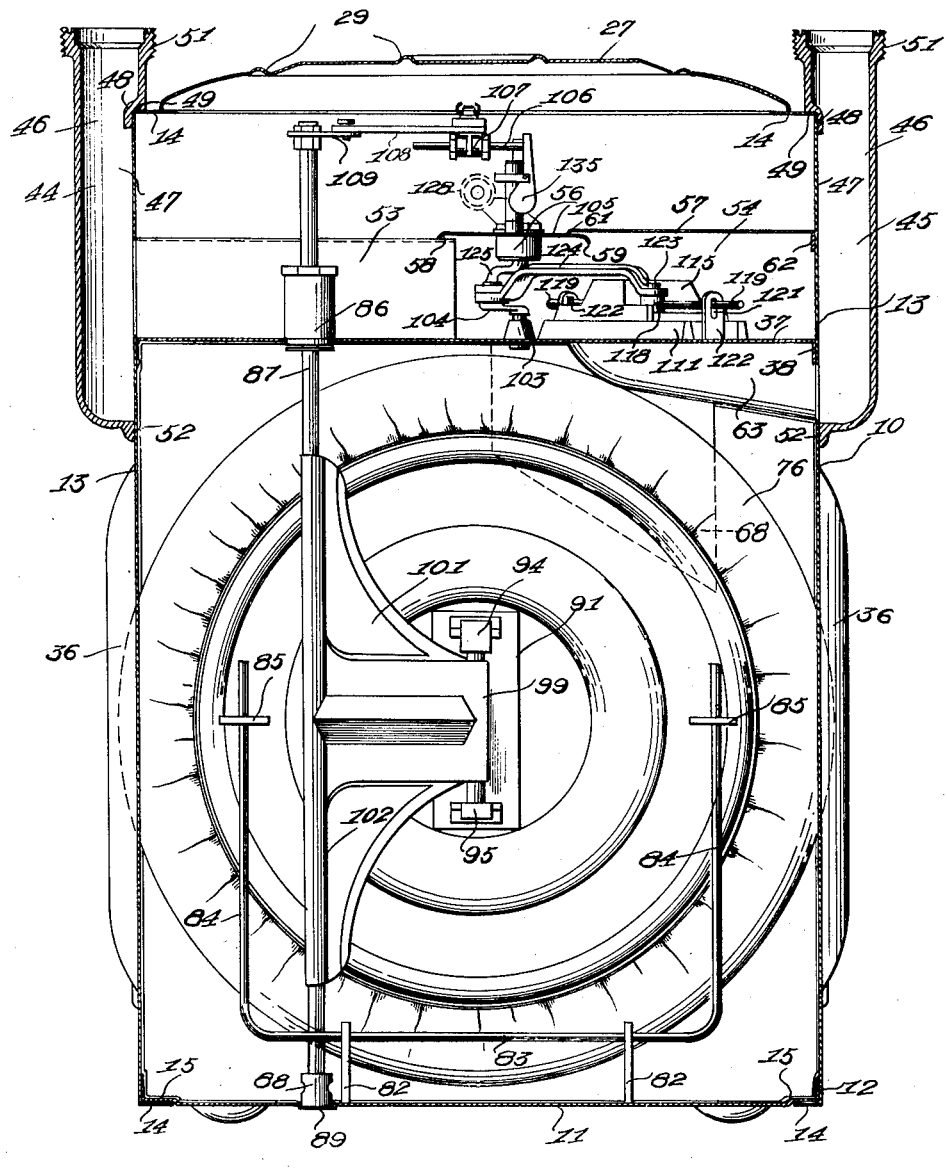

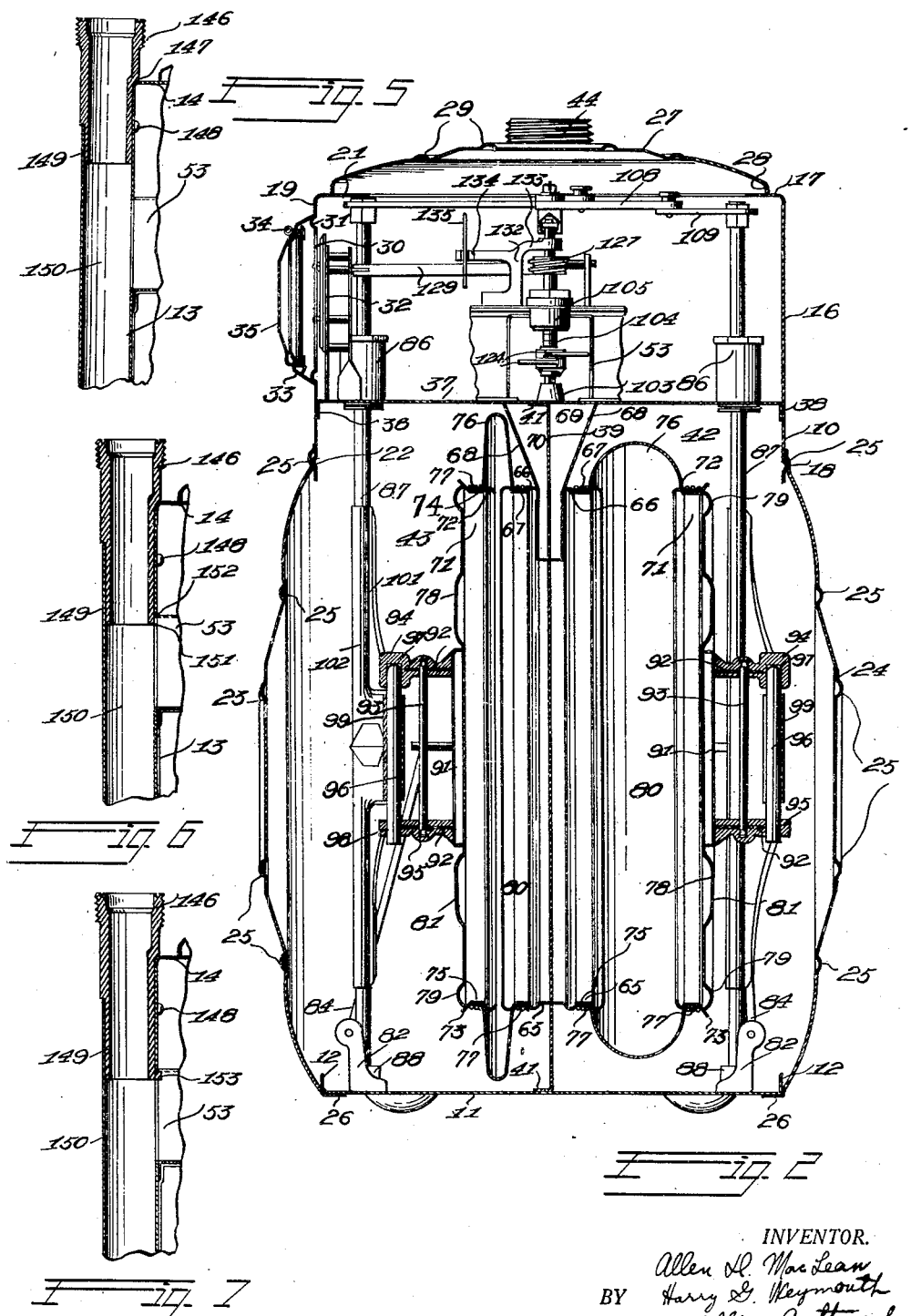

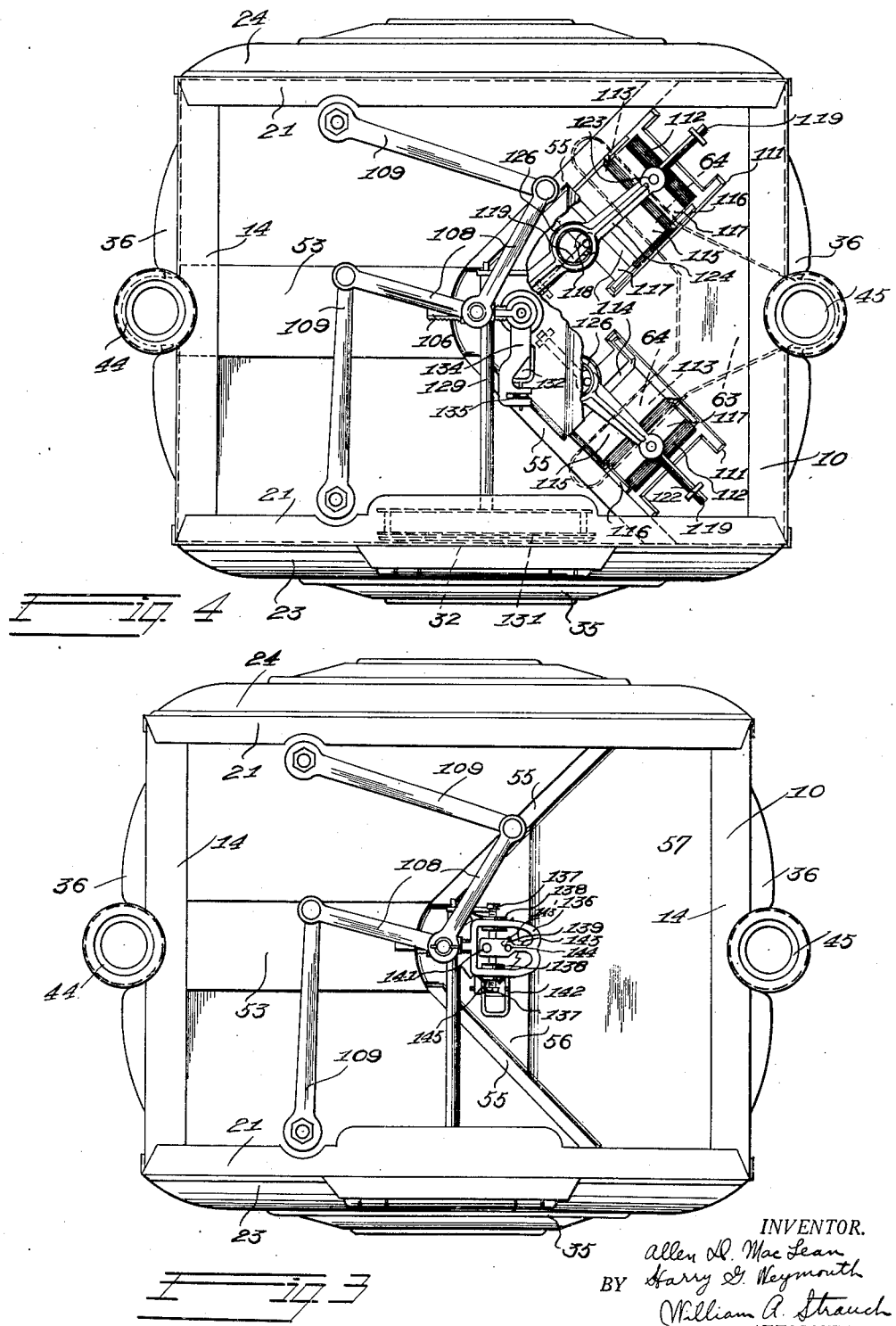

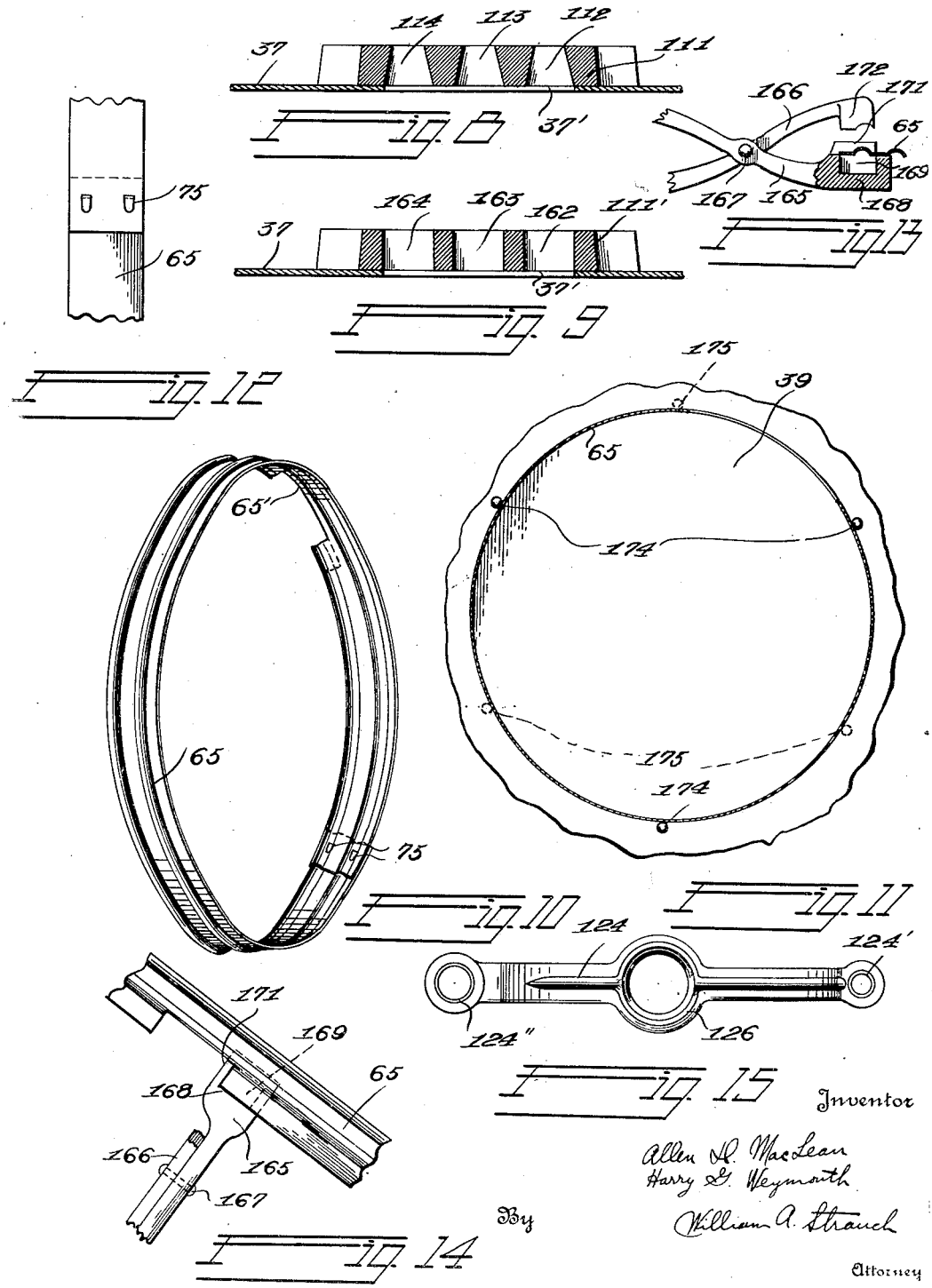

1,898,253

UNITED STATES PATENT OFFICE

ALLEN D. MacLEAN AND HARRY G. WEYMOUTH, OF PITTSBURGH, PENNSYLVANIA, ASSIGNORS TO PITTSBURGH EQUITABLE METER COMPANY, OF PITTSBURGH, PENNSYLVANIA, A CORPORATION OF PENNSYLVANIA

GAS METER

Application filed June 25, 1928. Serial No. 288,230.

The present invention relates to gas meters, and more particularly to meters of the dry gas type.

It has heretofore been sought to provide meters of this general character to operate on comparatively low gas pressures, light in weight, and comparatively inexpensive to manufacture, operating with reasonable accuracy and having a reasonable durability. Accordingly sheet tin has been used in the construction of low pressure inexpensive meter casings and other parts associated therewith providing a meter of substantially lighter weight than cast metal constructions, but which did not meet with entire satisfaction for the reason that in the prior proposed sheet tin constructions difficulty was experienced in soldering and unsoldering the joints between the different parts entering into the casing construction for assembly or repair, the solder and acid frequently fall into the meter mechanism and injure the parts, seriously impairing the operation of the meter.

Because of these difficulties with soldering operations, and of making sheet tin constructions sufficiently rigid, meter constructions with comparatively heavy metal parts adjacent the joints to strengthen the parts and for the reception of securing elements such as screws have been proposed, making the constructions of greater weight, more expensive, and more difficult to seal against leaks.

Tin meters of the above mentioned character are now constructed in two different well recognized standard sizes having different flow rate capacities and known as the "A" and "B" size meters. These meters are constructed to satisfy different demands and whether the "A" size meter or the "B" size meter is installed depends upon the flow demand to be met. Smaller valves are utilized in the smaller or "B" size meters than in the larger or "A" size meter and the maintenance costs are considered less so that where the demand is small the smaller meters are utilized. On the other hand, the larger or "A" size meter must be installed when the demand exceeds the flow rate capacity of the smaller or "B" size meter, resulting in the necessity of carrying repair and replacement parts for two meter sizes. Also the demand for gas is gradually increasing and frequent changes from the "B" to "A" size meters are required, which with the prior constructions necessitate installation of a new meter where such a change must be made and the use of the two different sizes of meters increases manufacturing and maintenance costs in practice.

It is a primary object of this invention to provide a gas meter that utilizes a maximum amount of tin, and is strong, durable, and effective in operation, while being of a minimum weight and comparatively inexpensive to manufacture.

Another object of the present invention is the provision of a meter, the operating parts of which are so formed and so arranged as to eliminate a substantial proportion of the hitherto existing strain and friction permitting the use of lighter parts and providing a more efficient and desirable construction.

Other objects of the invention are to provide meters so arranged that the parts may be effectively soldered and unsoldered without danger to the mechanism eliminating the necessity for securing parts in position by bolts or screws thereby eliminating leakage, and in which the parts are readily and accurately assembled and adjusted so that a high degree of accuracy can readily be established and maintained.

A still further object of the invention is the provision of a gas meter adapted for ready conversion from one flow rate capacity to another by the interchangeability of relatively few standardized parts, and permitting the utilization of a substantial proportion of standardized parts common to each size of meter, whereby the manufacturing and maintenance costs may be minimized.

With the foregoing objects in view as well as others that will become apparent from the following disclosure, reference will be had to the accompanying drawings forming part of same and in which—

Figure 1 is a vertical sectional view through the casing and gas inlet and gas outlet with the operating mechanism shown in side elevation, of a preferred form of my invention.

Figure 2 is a substantially central vertical sectional view at right angles to the view shown in Figure 1.

Figure 3 is a top plan view of the form of invention shown in Figure 1 with the top cover removed.

Figure 4 is a top plan view of a form of the invention with the valve chamber cover broken away and showing a modified form of tangent reverse stop mechanism.

Figure 5 is a fragmental longitudinal sectional view depicting a modification of the connection between the inlet or outlet with the casing.

Figure 6 is a similar view of a further modification.

Figure 7 is a fragmental view of a still further modification.

Figure 8 is a central longitudinal sectional view of a form of valve seat casting for a "B" size meter in applied position.

Figure 9 is a similar view of a form of valve seat casting for an "A" size meter.

Figure 10 is a perspective view of one of the diaphragm supporting rings.

Figure 11 is a vertical sectional view through one of the diaphragm supporting rings adjacent the partition to which the ring is secured disclosing ring positioning means.

Figure 12 is a fragmental plan view showing the connection between adjacent ends of the diaphragm supporting ring.

Figure 13 is a part sectional and part elevational view disclosing means for and the method of lengthening the conduit communicating apertures in the edges of the diaphragm supporting rings.

Figure 14 is a top plan view of the structure disclosed in Figure 13, and

Figure 15 is a top plan view of one of the valve actuating links.

Referring to the drawings by reference characters in which like characters designate like parts, 10 designates the casing which in its construction comprises a thin sheet tin bottom wall 11—marginally flanged outwardly as at 12, a pair of side walls 13 of thin sheet tin each inwardly flanged as at 14 at the inner and outer ends thereof with the inner flanges 14 soldered in depressions 15 in the edges of bottom wall 11, a back wall 16 (Figure 2) of sheet tin inwardly flanged at 17 at the outer end thereof and corrugated or beaded for strengthening and securing purposes at 18 adjacent the inner end thereof, and a front wall 19 inwardly flanged at 21 and beaded or corrugated for strengthening and securing purposes at 22 similarly to wall 16.

Arranged at the front and back of the meter is a pair of covers 23 and 24 respectively, each being outwardly bowed or dished and formed with a plurality of semi-circular beads or corrugations 25 for stiffening and reinforcing the thin sheet tin cover. The outer bead 25 of each cover engages the respective beads 18 and 22 and is soldered thereto in a manner leaving a protecting section of walls 16 and 19 projecting inward forming protecting shelves to prevent solder and acid from dropping into the casing. Each of the covers 23 and 24 is inwardly flanged at the inner end thereof as indicated at 26 which flanges are soldered to the base of bottom wall 11, in such manner that flanges 12 give protection against solder and acid dropping into the meter parts. A thin sheet tin cover 27 is provided with an inwardly directed marginal flange 28 resting upon and soldered to flanges 14 and 21 in a manner leaving protecting shelves during soldering operations. As shown in Figures 3 and 4 inwardly directed flanges 21 overlap inwardly directed flanges 14 and are soldered thereto at the contacting portions. Cover 27 is outwardly dished or arched and is provided with a plurality of stiffening and reinforcing beads or corrugations 29. Front wall 19 is provided with an opening 30 surrounded by a reinforcing corrugation 31 formed in alignment with the indicating mechanism 32 of usual construction. Soldered to wall 19 around corrugation 31 at the inwardly formed edges thereof is an apertured sheet tin cover plate 33 in a manner leaving a protecting shelf around the opening. Suitably hinged at 34 to cover plate 33 is a sheet tin door 35 for closing said opening in alignment with indicating mechanism 32. In this way it will be seen that all of the cover plates are dished and of corrugated sheet metal soldered in position in such manner and with the parts so arranged that protecting shelves against solder and acid dropping into the meter parts are formed around all of the cover plate openings, obviating danger to parts in soldering operations and the necessity for the use of heavy reinforcing and securing metallic parts.

Side walls 13 are outwardly depressed as indicated at 36 (Figure 1) to accommodate the flexible diaphragms hereinafter referred to. A horizontal partition 37 of sheet tin is disposed in casing 10 adjacent the inner ends of walls 16 and 19 and is provided with a marginal flange 38 which is soldered to walls 13, 16 and 19. Extending between bottom wall 11 and partition 37 is a centrally disposed vertically extending sheet tin partition 39 (Figure 2) provided with laterally extending flanges 41 at the opposite ends thereof which are soldered to wall 11 and partition 37, partition 39 defining with walls 11 and 13, covers 23 and 24 and partition 37 a pair of symmetrical bellows compartments or outer measuring chambers 42 and 43. A pair of inlet and outlet connections 44 and 45 (Figure 1) are provided at opposite sides of casing 10 intermediate the front and back thereof each comprising a bronze pipe or coupling member 46 open as at 47 and provided with an inwardly depressed tongue 48 forming with member 46 a shoulder 49 which in assembled position rests on adjacent flange 14 with tongue 48 engaging the outer surface of adjacent wall 13. Each member 46 is terminally threaded as at 51 for the gas main and gas distributing connections. A tongue 52 is provided on the bottom end of each member 46 for engagement with the respective wall 13, members 46 being riveted and soldered to walls 13 and flanges 14 to provide strong gas tight connections to the meter casing.

A sheet tin conduit or gallery 53 is soldered to the outer surface of partition 37 with one end thereof in communication with inlet connection 44 and the opposite end thereof in communication with a valve chamber 54 defined by one wall 13, partition 37, angularly disposed partitions 55 (Figures 3 and 4) a sheet tin crank shaft bearing supporting cover 56 and a sheet tin cover 57.

As shown in Figures 1, 3 and 4, cover 56 is provided with inwardly turned flanged strengthening edges 58 and 59 with edge 58 soldered to partitions 55 and the top of conduit 53 and one edge of cover 57 is provided with an inwardly directed flange 61 soldered to cover 56 inwardly of flange 59 thereof in a manner to provide protecting shelves against solder and acid. The opposite edge of cover 57 is provided with a flange 62 soldered to adjacent wall 13. Soldered at the edges thereof to the inner surface of partition 37 is a substantially Y-shaped conduit 63 (Figures 1 and 4) which at the base thereof is in communication with outlet connection 45, the branches 64 thereof opening through partition 37 to ports in the valve plate as will more fully hereinafter appear. Soldered at the adjacent edges thereof to opposite faces of partition 39 is a pair of sheet tin diaphragm supporting hoops or rings 65 which as shown in Figure 2 are corrugated or beaded as at 66 for reinforcing them and providing a diaphragm securing channel 67. Soldered to partition 37 and hoops 65 are a pair of sheet tin conduits 68 which with partition 39 define a pair of gas conducting channels 69 and 70 which communicate with valve chamber 54 through the valve ports as will more fully hereinafter appear and to the interior of rings 65 through recesses 65' therein.

Disposed within compartments 42 and 43 is a second pair of diaphragm supporting hoops or rings 71 which are constructed of sheet tin and at one edge thereof beaded as at 72 and at the opposite edge outwardly flanged as at 73 for reinforcing the hoops and providing diaphragm securing channels 74.

Rings 65 and 71 are preferably each constructed from a band of sheet tin, one end of which is provided with a pair of spaced outwardly turned integral tongues 75 (Figures 10 and 12) and the opposite end of which is provided with similarly spaced slits into which tongues 75 project when the band is bent into ring formation with the ends lapped as shown in Figure 10 to form the ring. After the ring is formed, tongues 75 are bent over into engagement with the band locking the parts into a ring of predetermined and accurate size. The lap joints and tongues 75 are soldered and rings 65 and 71 are then provided with the respective beads 66 and 72.

A flexible diaphragm 76 is disposed in each compartment 42 and 43, and each diaphragm is constructed of full sheep skin carefully tanned, machine sewed, and thoroughly treated with a special oil best adapted for use under all conditions and all kinds of gases. Each diaphragm 76 has the edges thereof disposed in channels 67 and 74 of the respective hoops or rings 65 and 71 which edges are secured to the hoops by twine 77 wrapped about the edges of diaphragms 76 by a special machine that does perfect pleating and keeps the twine at a uniform tension during the securing operation with the result that the diaphragms are accurately and uniformly and tightly secured to the hoops. A sheet tin diaphragm disk 78 provided with a peripheral bead 79 and an inwardly disposed reinforcing bead or corrugation 81 has the edge of bead 79 soldered to flange 73 of each diaphragm supporting hoop 71. Thus a pair of compartments or gas measuring chambers 80 is defined by partition 39, hoops 65 and 71, diaphragms 76 and disks 78 with which conduits 69 and 70 communicate.

Secured to bottom wall 11 adjacent each cover 23 and 24 and in compartments 42 and 43 respectively by soldering is a pair of spaced pivot posts 82 in which is pivoted the base portion 83 of a U-shaped diaphragm disk guiding member whose opposite parallel legs 84 slidably engage within guide retaining bars or brackets 85 secured at diametrically opposite points to the respective diaphragm disk.

Secured in partition 37 on each side of partition 39 is a stuffing box 86 providing a solid gas tight bearing for the vertically disposed rotatable flag rods 87, the inner ends of which are rotatably journaled in step bearings 88 soldered in locating depressions 89 in bottom wall 11. Flag rods 87 are connected to diaphragm disks 78 for turning movement upon movement of disks 78 due to the alternating unequal gas pressures in chambers 42, 43 and 80. The disks 78 disclosed are well adapted for connection to improved rocker shaft carrier constructions, each of which comprises a sheet tin flanged base plate 91 whose flange is soldered to disk 78 and integral outwardly extending reinforcing tongues 92 stamped therefrom through which extends in parallel spaced relation to plate 91 a spacing and reinforcing rod 93. A pair of white metal bearing posts 94 and 95 are cast on base plate 91 and around tongues 92 and opposite ends of rod 93 thus providing a comparatively cheap strong support for pintles or rocker shafts 96, the upper ends of which nest in a step bearing 97 in post 94 and the lower ends of which extend through apertures 98 in lower post 95. Secured to each rocker shaft 96 is the rolled narrow edge portion 99 of a flag or rocker arm 101 of sheet tin suitably reinforced by corrugations and the wider edge 102 of which is curled around and fixed to a flag rod 87 serving both to strengthen and actuate the flag rod.

Secured in partition 37 intermediate flag rods 87 and spaced from the plane thereof is a step bearing 103 in which the inner end of crank shaft 104 is journaled for rotation and whose intermediate portion is journaled in a white metal stuffing box and bearing 105 (Figure 2), secured in cover 56 in vertical alignment with bearing 103. Fixed to the outer end of crank shaft 104 is a tangent arm 106 provided with a longitudinally adjustable tangent post 107 to which the inner ends of links 108 are secured, the opposite ends of links 108 being pivotally secured to corresponding ends of flag arms 109 whose opposite ends are fixed to the outer ends of flag rods 87. Thus rotation is imparted to flag rods 87 through reciprocation of disks 78 which is transmitted to crank shaft 104 through links 108 and flag arms 109, rotating the crank shaft continuously in well known manner.

Soldered to the outer face of partition 37 is a pair of white metal valve seat castings 111 which as shown in Figure 4 are arranged in outwardly diverging relation and parallel with partitions 55. Each seat 111 is provided with three gas ports 112, 113 and 114, ports 112 communicating with outer measuring chambers 42 and 43 through partition 37, ports 113, communicating with branches 64 of outlet conduit 63 and ports 114 communicating with inner measuring chambers through conduits 69 and 70.

Slidably mounted on each valve seat 111 is a slide valve 115 which is of the arched or D type and preferably formed of white metal. Each valve 115 as shown in Figures 1 and 4 is provided with a pair of side guide bars 116 and a pair of plane valve seat engaging end members 117. Secured to the intermediate portion of each member 117 is a stud 118 on which is secured one end of a valve guide rod 119, the opposite end of which extends through a vertically elongated slot 121 in a lug 122 secured to partition 37. Rods 119 are rigid with the valves and are disposed parallel with the sides of valve seats 111, and accordingly maintain valves 115 in correct lateral relation on seats 111, slots 121, allowing for wear between the engaging surfaces of seats 111 and valves 115, and for proper seating of the valves.

The studs 118 on the further ends of valves 115 from the flag rods or the ends adjacent outlet 45 are provided with reduced pivot extensions 123 to which are pivotally secured the outer ends of relatively long outwardly bowed white metal valve actuating links 124, whose opposite or inner ends are journaled on the offset driving crank section 125 in crank shaft 104. By this construction long valve actuating links operating with a minimum angularity are provided, minimizing friction of operation of the valves, and at the same time a compact valve arrangement is secured. Each link 124 is provided in the offset portion intermediate its ends with an adjusting ring section 126 through which links 124 are lengthened or shortened by compressing ring sections in one direction or the other to adjust the position of valves 115 on seats 111.

Each link 124 as clearly shown in Figure 15 is provided with a bronze bushing 124' in the valve engaging end thereof and a bronze bushing 124" in the crank shaft engaging end thereof. Accordingly, an adjustable valve actuating link is provided which can be constructed of white metal permitting adjustability thereof as above set forth without sacrificing the durable bearing qualities thereof by utilizing the bronze bushings above referred to.

Crank shaft 104 supports a worm 127 in well known manner which meshes with a pinion 128 secured to shaft 129 extending to and imparting motion of crank shaft 104 to the indicating mechanism 32.

Means are preferably provided for limiting reverse movement of tangent arm 106 which as indicated in Figures 1, 2 and 4, comprises a bracket 132 secured to cover 56 and provided with oppositely extending projections 133 and 134, projection 133 providing a bearing for the upper end of crank shaft 104 and projection 134 having pivotally secured therein a gravity pawl 135 projecting into the path of tangent arm 106 permitting tangent arm 106 to move forwardly but stopping the rotation thereof upon reverse or backward movement.

As indicated in Figure 3, a duplex adjustable tangent arm 136 may readily be employed in place of the straight tangent arm 106 above described. Tangent arm 136 embodies means whereby tangent post 107 may be angularly adjusted comprising set screws 137 adjustably carried in bushings 138 and engaging at their inner ends the opposite edges of a flexible tongue 139 which is rigidly secured to crank shaft 104 as indicated at 141.

Furthermore as indicated in Figure 3, a single reverse revolution stop means may be employed in place of the mechanism above described and which comprises a bracket 142 rotatably supporting a ratchet 143 provided with a lug 143' for engagement with a pin 144 carried by arm 139 for causing rotation of ratchet 143 upon rotation of tangent arm 136, ratchet 143 being limited to rotation in a forward direction only by means of a gravity pawl 145. These parts are so arranged that upon reverse rotation of tangent arm 136 pin 144 will move away from engagement with the lug 143' carried by ratchet 143 and at the end of substantially one complete revolution in the reverse direction of tangent arm 136, pin 144 will engage the opposite side of lug 143' tending to reverse rotation of the ratchet wheel which will be prevented by pawl 145 engaging a tooth of the ratchet preventing further reverse movement of tangent arm 136. This reverse control mechanism is fully shown and claimed in copending application of H. G. Weymouth, Serial Number 261,798 filed March 15, 1928.

In Figure 5 is illustrated a modification of the inlet and outlet connections which comprises a relatively short bronze coupling 146 shouldered as at 147 for engagement with flange 14 at which point coupling 146 is soldered to flange 14. Coupling 146 terminates outwardly of the outer wall of conduit 53 and is preferably riveted to wall 13 between shoulder 147 and the inner end thereof as indicated at 148 as well as being soldered in position. Coupling 146 is reduced adjacent the inner end thereof as indicated at 149 in which rests the upper end of a sheet tin conduit 150, the upper end of which is soldered to coupling 146 and the opposite edges of which are soldered to wall 13. Conduit 150 extends substantially below the conduit 53 for the purpose of trapping water or liquids that may be entrained in the gas.

In Figure 6 a still further modification is illustrated wherein coupling 146 terminates slightly below the upper wall of conduit 53 to provide an extension 151 to permit a seal of solder as indicated at 152 to be conveniently made across the junction point of the meter side wall with outlet and inlet couplings. This joint provides a seal against gas leakage in event the solder seals at flange 14 are broken in installation of the meter.

In Figure 7 a still further modification is illustrated in which coupling 146 terminates as in the form shown in Figure 6 and is provided with a shoulder 153 for engagement under the outer wall of conduit 53 at which point solder may be conveniently applied for securing coupling 146 firmly in position and to provide an additional seal against gas leakage.

In the operation of the meter above described, inlet 44 and outlet 45 are connected with a gas supply pipe system. The operating mechanism remains stationary until a gas vent is afforded in communication with outlet 45. Thereupon, the gas flows through the meter entering through conduit 53 into valve chamber 54 and is alternately admitted to and expelled from measuring chambers 42, 43 and 80 through ports 112, 114 and 113 respectively of valve seats 111 under control of valves 115 in well known manner. The alternate admission and expulsion of gas to and from measuring chambers 42, 43 and 80 causes movement of diaphragms 76 which in turn impart reciprocating movement to disks 78 which through rocker shafts 96 and rocker arms 101, oscillate flag rods 87 which in turn through flag arms 109 and links 108 impart rotation to crank shaft 104. Crank shaft 104 through meshing worm 127 and pinion 128 drives indicating mechanism 32. Crank shaft 104 further imparts reciprocating motion to valves 115 through arms 124, and the valves, in cooperation with ports 112, 113 and 114 regulate the flow of gas to and from measuring chambers 42, 43 and 80.

In meters of the character disclosed the flow rate capacity thereof is determined by the flow through the meter at a given pressure drop between the meter inlet and outlet, and is determined largely by the area of the ports in the valve seats and the area of ports 65' in rings 65. In accordance with the present invention, the size of meters is altered by changing the valve and diaphragm port sizes to vary the flow rate capacity of the meter. Accordingly, as illustrated in Figures 8 and 9, two different forms of standard meter valve seat castings 111 and 111' are provided. Seat 111 is provided with ports 112, 113 and 114 as above described to provide a "B" size meter and seat 111' is provided with ports 162, 163 and 164, for an "A" size meter.

The partition 37 to which the valve seats are soldered is, as indicated in Figures 8 and 9 provided with a rectangular aperture 37' of such dimensions that the ports in the valve seats will all open through partition 37. The apertures 37' in partition 37 are of uniform and standard dimensions for both "A" and "B" size meters and the valve seats 111 and 111' are of like external dimensions. The ports 112, 113 and 114 in seat 111 have the same longitudinal spacing and base areas as the ports 162, 163 and 164 in seat 111', but as indicated, the upper ends of ports 112, 113 and 114 are of less width and consequently less area than the outer ends of ports 162, 163 and 164. This difference in area is caused preferably, by providing the dividing partitions between ports 112, 113 and 114 with inclined walls as shown. Valve seats 111 having ports of less area communicating with valves 115 are employed in the smaller flow rate capacity or "B" type meter and rings 65 are provided with recesses 65' of dimensions for proper cooperation with the ports in seats 111. In manufacture, all of the parts of the "A" and "B" size meters except the valves, valve seats, crank shafts, and diaphragm ring port areas are the same and interchangeable. The crank shafts throw must be varied to correspond to the valve and valve seat size. In initial manufacture the "A" and "B" meters except for the parts noted are interchangeable. To convert from one size meter to another in service the valve seats are unsoldered from partition 37 and seat 111 or 111' substituted therefor and soldered to partition 37, and the valves and crank shafts are changed to the proper size. Upon changing the dimensions of the ports in the valve seats it will be necessary to proportionally change the dimensions of recesses 65' in rings 65. In changing from a "B" to an "A" meter this can be readily accomplished by unsoldering rings 65 and lengthening recesses 65' by snipping out portions of the material thereof by a tool such as illustrated in Figures 13 and 14 which comprises a pair of intersecting lever arms 165 and 166 pivoted together at 167. Arm 165 is provided with a seat portion 168 provided with a rectangular recess 169 and a gauge lug 171, while arm 166 is provided with a rectangular punch head 172 conforming to recess 169.

In the use of the tool to convert a "B" size ring into an "A" size ring, seat portion 168 is engaged under the material of ring 65 with gauge lug 171 in recess 65' in engagement with one end thereof for accurately positioning recess 169 in order that a correct amount of material may be snipped from ring 65 to provide for the proper lengthening of recesses 65'. With seat member 168 thus positioned head 172 is manually forced downward into engagement with band 65 above recess 169 and due to the relative thinness of ring 65 the material thereof resting over recess 169 will be punched therefrom resulting in a corresponding lengthening of recess 65'. In practice it will accordingly be seen that replacement diaphragm constructions for "B" size meters may be carried in stock, and by cutting the ports to proper size, may be used in "A" size meters and standardized diaphragm parts for the two sizes of meters may accordingly be utilized.

It will accordingly be seen that a meter construction is provided embodying the above noted desirable characteristics which is substantially a standardized construction for both small and large flow rate capacities as it is only necessary to perform the above described comparatively simple operations for converting the meter from one flow rate capacity to another. If a meter of low flow rate capacity is required valve seats 111 as shown in Figure 8 are employed as well as standardized rings 65 provided with recesses 65' which can readily be converted into a large flow rate capacity meter by substituting seat 111' for seat 111 and correspondingly lengthening recesses 65' by the snipping operation above described and providing suitable valves and crank shafts, and the large flow rate capacity meter thus provided can be converted into a low flow rate capacity meter with equal facility involving the substitution of seat 111 for seat 111' and substituting standardized rings 65 with recesses 65' as well as the substitution of proper cooperating valves and a crank shaft therefor.

In order to facilitate the positioning of rings 65 which must be initially properly positioned, and removed and replaced at each conversion or diaphragm replacement operation, partition 39 is provided on opposite sides thereof with outwardly punched projections 174 and 175 with projections 174 preferably in staggered relation to projections 175 as illustrated in Figure 11, there being preferably three such projections on each side of partition 39 and so disposed that rings 65 will snugly fit there within whereby the rings can be quickly positioned without it being necessary to determine the proper location and alignment of the rings with relation to the flag rods.

From the foregoing disclosure it will be appreciated that a gas meter is provided which while of the same general construction as similar meters heretofore proposed embodies such improvements as to overcome the well recognized objections or defects of heretofore proposed gas meters of this general character.

The present invention provides a very light meter construction due to the fact that the entire casing, partitions, conduits and other parts are constructed of sheet tin, the parts being corrugated and dished to provide strong rigid constructions. Furthermore, it will be appreciated that the different parts entering into the construction can be soldered or unsoldered without danger of solder or acid falling into and injuring the mechanism due to the comparatively wide protruding flanges at the different joints which prevent solder or acid falling within the casing.

Furthermore, the construction is such that access can be gained to the interior if necessary by unsoldering any particular part which can be quickly and cheaply accomplished as care need not be taken to avoid injury due to solder or acid falling within the interior of the casing, providing ready access to the mechanism for repairs, and for adjustments which can be made with facility by means of the various novel adjusting mechanisms provided.

While various embodiments of the invention have been disclosed in detail, it is to be understood that the invention is not limited thereto, but such changes or alterations are contemplated as fall within the scope of the appended claims. Accordingly, what is claimed and desired to be secured by Letters Patent is—

1. In a gas meter, in combination, a crank shaft and a pair of slide valves, valve actuating links pivotally secured to said crank shaft and each of said valves, each of said links being attached to the ends of said valves remote from said crank shaft, each of said links being provided with an adjusting ring section.

2. In combination with the metallic casing of a gas meter, inlet and outlet connections each comprising a tubular coupling member provided with a shoulder for engagement with said casing and a reduced portion, a sheet metal conduit secured to said casing and surrounding the reduced portion of said coupling member, said coupling member being soldered to said casing adjacent said shoulder.

3. In a gas meter, a valve actuating link comprising an elongated bar having an arched section extending substantially the entire length of the bar and adapted to be pivotally connected at opposite ends thereof to a valve and crank shaft of a meter; said bar being provided intermediate the ends thereof in its arched section with a substantially annular yieldable section adapted on distortion thereof to lengthen or shorten said bar.

4. In a gas meter, a casing of thin sheet metal; a plurality of spaced depressions formed in the bottom of said casing; step bearings secured in and located by said depressions; vertically extending flag rods, the lower ends of which are journaled in and supported by said step bearings, a horizontal partition secured in said casing through which said flag rods extend; and combined stuffing boxes and bearings secured in said horizontal partition in which said flag rods are journaled.

5. In a gas meter, in combination, a crank shaft and a pair of slide valves; adjustable valve actuating links pivotally secured to said crank shaft and each of said valves, each of said links being attached to the ends of said valves remote from said crank shaft; and an adjustable section provided in each of said links whereby each of said valves may be adjusted independently of the other.

In testimony whereof we affix our signatures.

ALLEN D. MacLEAN.
HARRY G. WEYMOUTH.